United States Patent
Wang et al.

(10) Patent No.: US 9,632,253 B1
(45) Date of Patent: Apr. 25, 2017

(54) VARIABLE OPTICAL ATTENUATOR WITH A TRANSMITTING NON-ATTENUATING DIFFRACTING PRISM

(71) Applicant: Alliance Fiber Optic Products, Inc., Sunnyvale, CA (US)

(72) Inventors: Xinzhong Wang, Fremont, CA (US); Yu Huang, San Jose, CA (US); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 15/349,369

(22) Filed: Nov. 11, 2016

Related U.S. Application Data

(60) Provisional application No. 62/386,064, filed on Nov. 12, 2015.

(51) Int. Cl.
*G02B 6/42* (2006.01)
*G02B 6/26* (2006.01)
*G02B 6/34* (2006.01)

(52) U.S. Cl.
CPC .............. *G02B 6/266* (2013.01); *G02B 6/34* (2013.01); *G02B 6/4225* (2013.01); *G02B 6/4226* (2013.01); *G02B 6/4286* (2013.01)

(58) Field of Classification Search
CPC .. H04Q 2011/003; H04J 14/0212; G02F 1/31; G02F 1/011; G02B 5/1814;
(Continued)

(56) References Cited

U.S. PATENT DOCUMENTS 5,325,459 A   6/1994   Schmidt
5,900,983 A   5/1999   Ford et al.
(Continued)

FOREIGN PATENT DOCUMENTS

CN   102591007 A   7/2012
EP      1536265 A1   6/2005
(Continued)

OTHER PUBLICATIONS

Ku et al., "Polarization Independent VOA Based on Dielectrically Stretched Liquid Crystal Droplet", Optics Express, 2012, vol. 20, No. 15, 17059-17064, Optical Society of America.

*Primary Examiner* — Thomas A Hollweg
*Assistant Examiner* — Mary A El Shammaa
(74) *Attorney, Agent, or Firm* — Dinsmore & Shohl LLP

(57) ABSTRACT

A variable optical attenuator is provided. The variable optical attenuator includes an input optical fiber, an output optical fiber, a non-attenuating, transmission-type diffracting prism and a prism positioning system. The input optical fiber, the non-attenuating, transmission-type diffracting prism and the output optical fiber are optically arranged such that an optical path from the input core of the input optical fiber to the output core of the output optical fiber passes through the non-attenuating, transmission-type diffracting prism. The non-attenuating, transmission-type diffracting prism diffracts an optical signal propagating from the input optical fiber to the output optical fiber such that an input portion of the optical path is non-linear with an output portion of the optical path. The prism positioning system changes a pose of the non-attenuating, transmission-type diffracting prism within the optical path thereby attenuating the optical signal.

21 Claims, 8 Drawing Sheets

(58) Field of Classification Search
CPC .. G02B 6/12004; G02B 6/122; G02B 6/4214; G02B 6/0016; G02B 26/0816
See application file for complete search history.

(56) References Cited

U.S. PATENT DOCUMENTS

| | | | |
|---|---|---|---|
| 6,549,314 B1* | 4/2003 | Yamaguchi | G02F 1/3515 |
| | | | 359/108 |
| 6,590,697 B2 | 7/2003 | Vaganov | |
| 6,628,882 B2 | 9/2003 | Vaganov et al. | |
| 6,724,971 B2 | 4/2004 | Chang | |
| 6,781,736 B2 | 8/2004 | Hoyt et al. | |
| 6,785,437 B2 | 8/2004 | Hagood et al. | |
| 6,904,223 B1 | 6/2005 | Fang et al. | |
| 7,009,693 B2 | 3/2006 | Takashina et al. | |
| 7,046,417 B2 | 5/2006 | Hoyt et al. | |
| 7,155,105 B2 | 12/2006 | McDonald | |
| 7,194,153 B1 | 3/2007 | Yajima et al. | |
| 7,212,721 B2 | 5/2007 | Imai et al | |
| 7,295,748 B2 | 11/2007 | Chen et al. | |
| 7,433,139 B2 | 10/2008 | Stolk | |
| 7,546,008 B2 | 6/2009 | Fujino et al. | |
| 8,538,299 B2 | 9/2013 | Izawa et al. | |
| 8,712,198 B2* | 4/2014 | Bicknell | G02B 6/125 |
| | | | 385/24 |
| 2001/0046363 A1 | 11/2001 | Purchase et al. | |
| 2002/0167695 A1 | 11/2002 | Senturia | |
| 2003/0026583 A1 | 2/2003 | Hoyt et al. | |
| 2003/0049009 A1 | 3/2003 | Vaganov et al. | |
| 2003/0090776 A1 | 5/2003 | Vaganov | |
| 2003/0103757 A1 | 6/2003 | Chang | |
| 2004/0037493 A1 | 2/2004 | Lee et al. | |
| 2004/0179841 A1* | 9/2004 | Shahar | H04J 14/08 |
| | | | 398/75 |
| 2004/0240026 A1 | 12/2004 | Hoyt et al. | |
| 2005/0068645 A1* | 3/2005 | Nagaeda | G02F 1/31 |
| | | | 359/852 |
| 2005/0128591 A1* | 6/2005 | Shiozaki | G02B 5/1814 |
| | | | 359/566 |
| 2005/0128924 A1* | 6/2005 | Nakae | G02B 6/4214 |
| | | | 369/121 |
| 2005/0135773 A1 | 6/2005 | McDonald | |
| 2006/0013553 A1 | 1/2006 | Imai et al. | |
| 2006/0133761 A1 | 6/2006 | McDonald | |
| 2006/0280421 A1 | 12/2006 | Tanaka et al. | |
| 2008/0044152 A1 | 2/2008 | Fujino et al. | |
| 2008/0181559 A1* | 7/2008 | Corem | G02B 6/272 |
| | | | 385/18 |
| 2008/0260390 A1* | 10/2008 | Barbarossa | G02F 1/31 |
| | | | 398/139 |
| 2013/0194537 A1* | 8/2013 | Mao | G02F 1/133528 |
| | | | 349/196 |
| 2015/0304050 A1 | 10/2015 | Watanabe | |
| 2015/0316725 A1* | 11/2015 | Nakajima | G02B 6/3548 |
| | | | 385/22 |

FOREIGN PATENT DOCUMENTS

| | | |
|---|---|---|
| EP | 1887384 A1 | 2/2008 |
| EP | 2933934 A1 | 10/2015 |
| WO | 0167166 A1 | 9/2001 |
| WO | 0244800 A2 | 6/2002 |
| WO | 03015455 A2 | 2/2003 |
| WO | 03023467 A2 | 3/2003 |

* cited by examiner

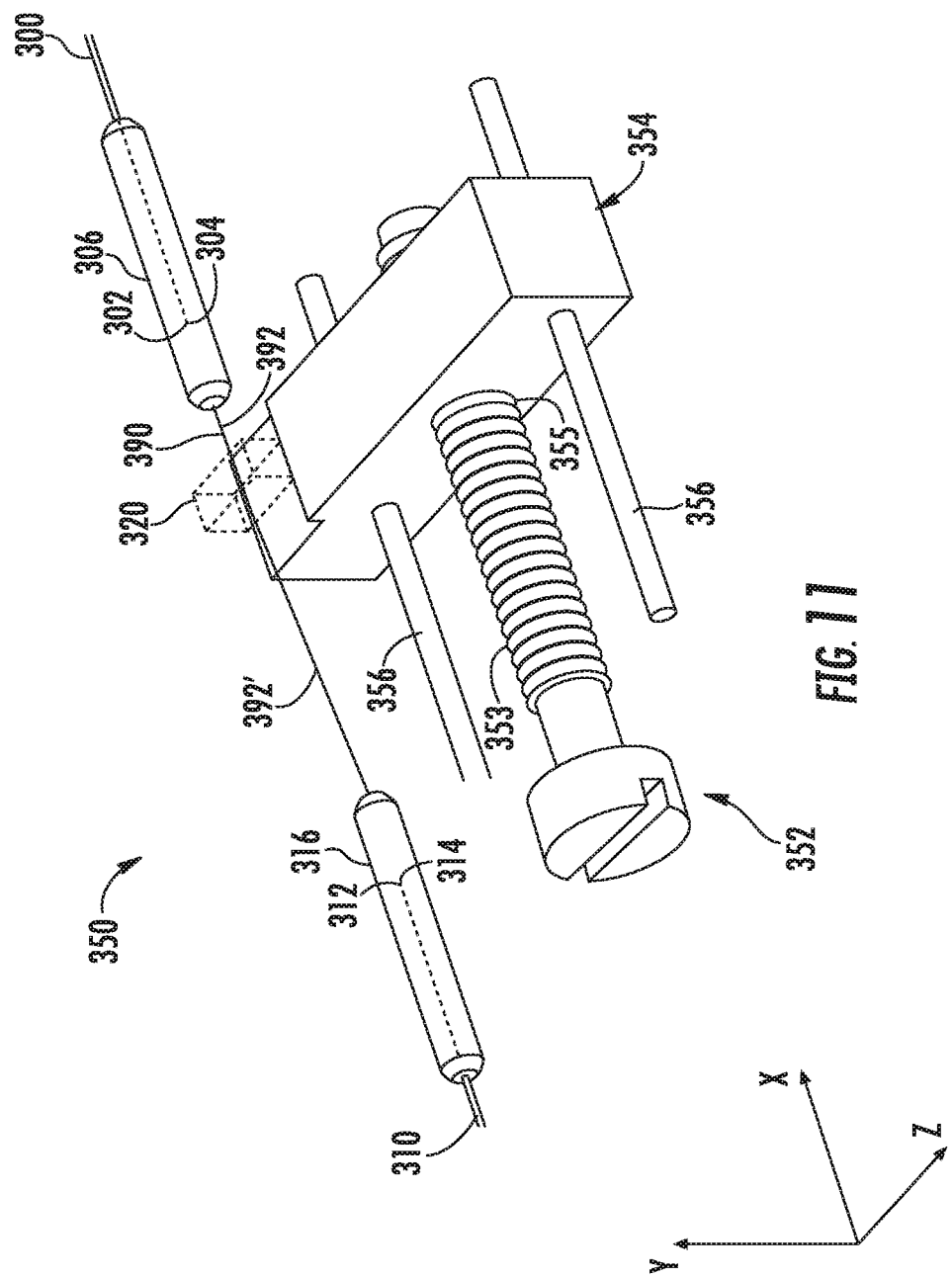

VARIABLE OPTICAL ATTENUATOR WITH A TRANSMITTING NON-ATTENUATING DIFFRACTING PRISM

CROSS-REFERENCE TO RELATED APPLICATIONS

This application claims the benefit of U.S. Provisional Application Ser. No. 62/386,064, filed Nov. 12, 2015, the contents of which are incorporated herein by reference in their entirety.

BACKGROUND

Field

The present disclosure relates to variable optical attenuators and, more specifically, to variable optical attenuators with a diffracting prism and prism positioning system.

Technical Background

Variable optical attenuators (VOAs) are known and widely used in fiber optical communication systems. For example, one type of variable optical attenuator is based on an MEMS actuator that operates via a resilient mechanical hinge designed into a MEMS chip. When an electrical signal is applied to the MEMS chip the mechanical hinge may be moved into attenuating position such that a portion of an optical signal is blocked. Once the electrical signal is terminated, the mechanical hinge moves to a non-attenuating position in which light from a fiber optic is not blocked. In the alternative, the mechanical hinge can be oriented such that the supply of an electrical signal to the MEMS chip places the mechanical hinge into the non-attenuating position and when the electrical signal is terminated the mechanical hinge returns to the attenuating position. Such variable optical attenuators are relatively complex and require MEMS chip manufacturing.

Another type of variable optical attenuator is a neutral density (ND) filter that reduces or modifies the intensity of all wavelengths or colors of a light signal equally. A variation of the neutral density filter is a gradient neutral density filter that only blocks certain wavelengths of an optical signal. However, manufacture of a neutral density filter, particularly a gradient neutral density filter, requires complex processes and equipment. Also, an optical signal passing through a gradient neutral density filter may be impaired by the reflection of the optical signal surfaces of shapes or particles contained in the filter. Accordingly, an improved variable optical attenuator is desired.

BRIEF SUMMARY

According to the subject matter of the present disclosure, a variable optical attenuator comprises an input optical fiber, an output optical fiber, a non-attenuating, transmission-type diffracting prism, and a prism positioning system. The input optical fiber has an input core and the output optical fiber has an output core. The input optical fiber, the non-attenuating, transmission-type diffracting prism and the output optical fiber are optically arranged such that an optical path from the input core of the input optical fiber to the output core of the output optical fiber passes through the non-attenuating, transmission-type diffracting prism. The non-attenuating, transmission-type diffracting prism comprises an input face and an output face oriented at a non-zero angle relative to the input face that diffracts an optical signal propagating from the input optical fiber to the output optical fiber such that an input portion of the optical path from the input core to the input face of the non-attenuating, transmission-type diffracting prism is non-linear with an output portion of the optical path from the output face of the non-attenuating, transmission-type diffracting prism to the output core. The prism positioning system changes the pose of the non-attenuating, transmission-type diffracting prism within the input portion of the optical path and changing the pose of the non-attenuating, transmission-type diffracting prism varies the degree to which the output portion of the optical path from the output face of the non-attenuating, transmission-type diffracting prism aligns with the output core of the output optical fiber.

In accordance with one embodiment of the present disclosure, the prism positioning system of the variable optical attenuator moves the non-attenuating, transmission-type diffracting prism in a direction along which the non-attenuating, transmission-type diffracting prism moves into or out of the input portion of the optical path from the input core to the input face of the non-attenuating, transmission-type diffracting prism. In such an embodiment a thickness through which the optical signal passes between the input face and the output face of the non-attenuating, transmission-type diffracting prism changes.

In accordance with another embodiment of the present disclosure, the prism positioning system moves the non-attenuating, transmission-type diffracting prism in a direction generally parallel to the input portion of the optical path from the input core to the input face of the non-attenuating, transmission-type diffracting prism. In such an embodiment a distance between the input face of the non-attenuating, transmission-type diffracting prism and the input core of the input optical fiber changes.

In accordance with another embodiment of the present disclosure, the prism positioning system comprises a threaded shaft and a threaded block, wherein the non-attenuating, transmission-type diffracting prism is attached to the threaded block and rotating of the threaded shaft moves the threaded block and the non-attenuating, transmission-type diffracting prism in the direction generally parallel to the input portion of the optical path from the input core to the input face of the non-attenuating, transmission-type diffracting prism.

In accordance with another embodiment of the present disclosure, the prism positioning system moves the non-attenuating, transmission-type diffracting prism in a direction along which the non-attenuating, transmission-type diffracting prism moves into or out of the input portion of the optical path from the input core to the input face of the non-attenuating, transmission-type diffracting prism and in another direction generally parallel to the optical path from the input core to the input face of the non-attenuating, transmission-type diffracting prism.

In accordance with another embodiment of the present disclosure, the variable optical attenuator further comprises an intensity-independent positioning feedback system comprising a feedback light source, a light source integrity photodetection zone, and a prism movement photodetection zone. The feedback light source defines an optically diverging interrogation path and the light source integrity photodetection zone and the prism movement photodetection zone are positioned in different portions of the optically diverging interrogation path. The degree of optical obstruction in the prism movement photodetection zone varies with movement of the non-attenuating, transmission-type diffracting prism such that an intensity feedback signal from the prism movement photodetection zone is indicative of prism movement. Also, the degree of optical obstruction in the light source integrity photodetection zone is independent of movement of the non-attenuating, transmission-type diffracting prism such that an intensity feedback signal from the light source integrity photodetection zone is indicative of an absolute intensity of the feedback light source.

Although the concepts of the present disclosure are described herein with primary reference to optical fibers, it is contemplated that the concepts will enjoy applicability to any optical signal system. For example, and not by way of limitation, it is contemplated that the concepts of the present disclosure will enjoy applicability to a variety of optical networks and optical devices.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 11 is a schematic illustration of a manual prism positioning system for a variable optical attenuator according to one or more embodiments disclosed and described herein.

DETAILED DESCRIPTION

Figure 1:
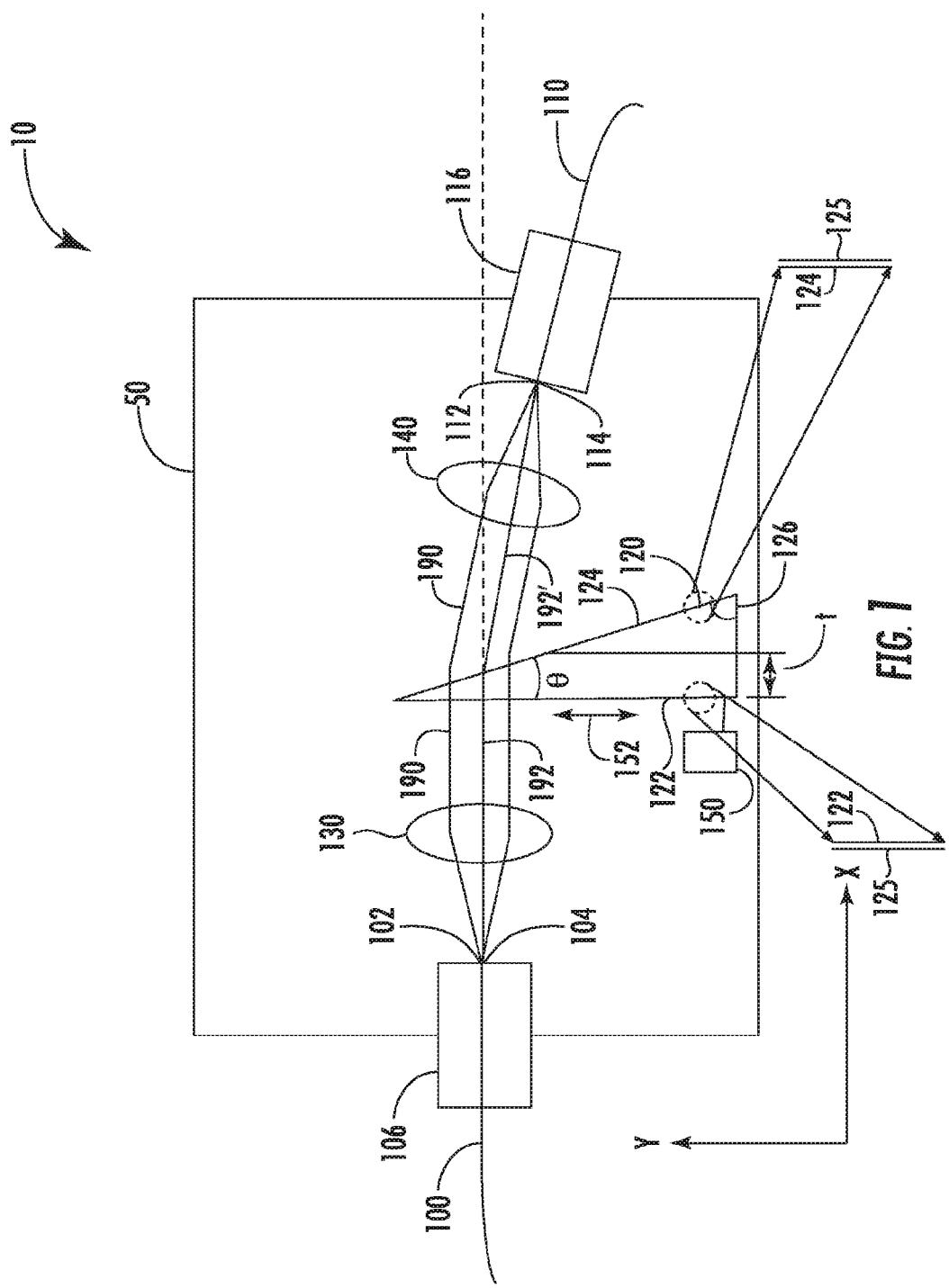
FIG. 1 is a schematic illustration of a variable optical attenuator according to one or more embodiments disclosed and described herein with a non-attenuating, transmission-type diffracting prism located in a first position.

Referring initially to FIG. 1, a variable optical attenuator 10 according to the present disclosure may comprise an input optical fiber 100, an output optical fiber 110, a non-attenuating, transmission-type diffracting prism 120, and a prism positioning system 150. For the purposes of defining and describing a non-attenuating, transmission-type diffracting prism of the present disclosure, it is noted that the prism is "non-attenuating" in the sense that its function and use in the disclosed variable optical attenuator does not depend on its absorption properties of optical attenuation. Rather, the variable optical attenuator of the present disclosure takes advantage of the diffractive optical properties of the prism to alter the path of an optical signal propagation in the optical system to achieve variable optical attenuation. This optical configuration may be contrasted with absorption-type prisms where an optical signal is attenuated by absorption of the optical signal (see, for example, the absorption type optical prisms disclosed in U.S. Pat. No. 5,325,459). Similarly, the non-attenuating, transmission-type diffracting prism of the present disclosure is a "transmission-type" prism in the sense that its function and use in the disclosed variable optical attenuator does not depend on reflection properties for optical attenuation. Rather, the variable optical attenuator of the present disclosure takes advantage of the diffractive optical properties of the prism to alter the path of an optical signal propagation in the optical system to achieve variable optical attenuation. This optical configuration may be contrasted with reflection-type prisms where an optical signal is attenuated by reflection of the optical signal (see, for example, the reflection type optical prisms disclosed in U.S. Pat. Nos. 6,904,223 and 8,538,299).

Still referring to FIG. 1, the input optical fiber 100 has an input end 102 with an input core 104 and the output optical fiber 110 has an output end 112 with an output core 114. In embodiments, the input optical fiber 100, output optical fiber 110 and non-attenuating, transmission-type diffracting prism 120 are at least partially enclosed within and attached to an enclosure 50, i.e., the enclosure 50 may provide a structure support or base for the various components of the variable optical attenuator 10. The input optical fiber 100 may be attached to and aligned with an input fiber handling ferrule 106 and the output optical fiber 110 may be attached to and aligned with an output fiber handling ferrule 116. The input fiber handling ferrule 106 may be aligned non-parallel to the output fiber handling ferrule 116. The non-attenuating, transmission-type diffracting prism 120 has an input face 122 and an output face 124 oriented at a non-zero angle θ relative to the input face 122. A base face 126 may extend between the input face 122 and the output face 124. An optical signal 190 from the input core 104 of the input optical fiber 100 is transmitted through the non-attenuating, transmission-type diffracting prism 120 by passing through the input face 122 and the output face 124. The non-attenuating, transmission-type diffracting prism 120 diffracts the optical signal 190 from the input core 104 of the input optical fiber 100 onto the output core 114 of the output optical fiber 110 such that an input portion of the optical path 192 from the input core 104 of the input optical fiber 100 to the input face 122 is non-linear with an output portion of the optical path 192' from the output face 124 to the output core 114 of the output optical fiber 110. Also, an input lens 130 may be positioned between the input core 104 of the input optical fiber 100 and the input face 122 of the non-attenuating, transmission-type diffracting prism 120 and an output lens 140 may be positioned between the output face 124 and the output core 114 of the output optical fiber 110. The input lens 130 may be a collimating lens that collimates the optical signal 190 propagating from the input core 104 of the input optical fiber 100 to the input face 122 and the output lens 140 may be a focusing lens that focuses the collimated optical signal 190 propagating from the output face 124 to the output core 114 of the output optical fiber 110. In embodiments, an anti-reflection coating 125 extends over the input face 122 and the output face 124 in order to minimize or eliminate reflection of the optical signal 190 by the input face 122 and the output face 124.

The prism positioning system 150 is configured to change the pose of the non-attenuating, transmission-type diffracting prism 120 within the input portion of the optical path 192. Changing the pose of the non-attenuating, transmission-type diffracting prism 120 within the input portion of the optical path 192 changes or varies the degree to which the output portion of the optical path 192' is aligned with the output core 114 of the output optical fiber 110. Varying the degree to which the output portion of the optical path 192' is aligned with the output core 114 of the output optical fiber 110 varies the amount of attenuation of the optical signal 190 as discussed in greater detail below. For the purposes of defining the variable optical attenuator of the present disclosure, it is noted that the term "pose" includes position, orientation, or position and orientation, that is, changing the pose of the non-attenuating, transmission-type diffracting prism 120 includes changing the position, orientation, or position and orientation of the non-attenuating, transmission-type diffracting prism 120. Also, the degree or amount to which the output portion of the optical path 192' is misaligned with the output core 114 of the output optical fiber 110 may be referred to herein as "radial mismatch" or "lateral shift."

Figure 2:
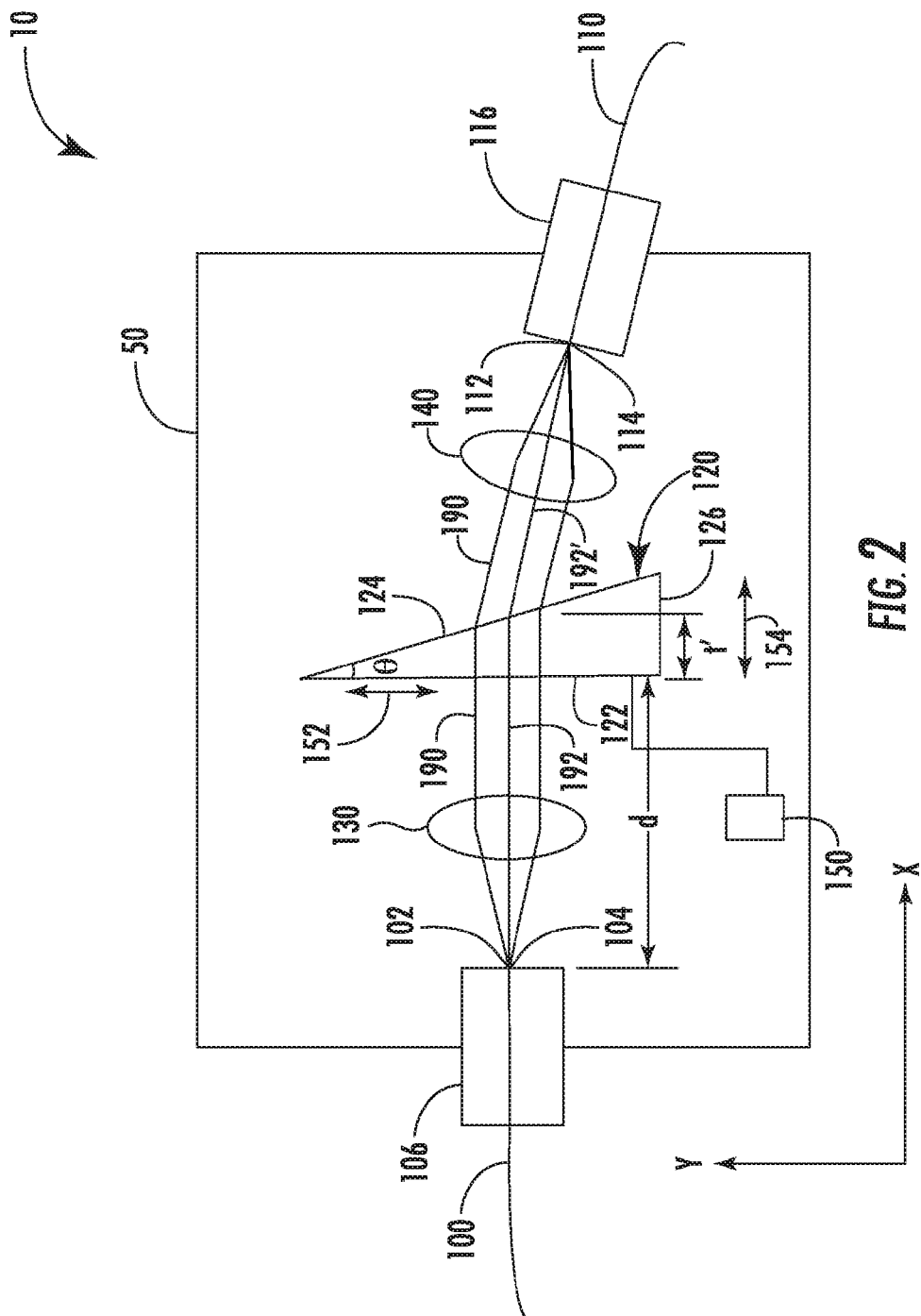
FIG. 2 is a schematic illustration of the variable optical attenuator shown in FIG. 1 with the non-attenuating, transmission-type diffracting prism depicted as having been moved in the +Y direction and located in a different position than the non-attenuating, transmission-type diffracting prism in FIG. 1.

Referring to FIGS. 1 and 2, in embodiments the prism positioning system 150 moves the non-attenuating, transmission-type diffracting prism 120 in a direction along which the non-attenuating, transmission-type diffracting prism 120 moves into or out of the input portion of the optical path 192 as indicated by the double headed arrow 152 in FIG. 1 (+/−Y direction in the figures). In such embodiments, a thickness 't' between the input face 122 and the output face 124 through which the optical signal 190 passes through changes, i.e., increases or decreases. Also, an angle formed between the input portion of the optical path 192 and the input face 122 may be less than 90°, e.g., between about 1° to about 5° less than 90°, such that reflection of the optical signal 190 at the input face 122 is minimized. In other embodiments, the prism positioning system 150 moves the non-attenuating, transmission-type diffracting prism 120 in a direction generally parallel to the input portion of the optical path 192 as indicated by the double headed arrow 154 in FIG. 2 (+/−X direction in the figure). In such embodiments, a distance 'd' between the input face 122 and the input core 104 of the input optical fiber 100 changes. In still other embodiments, the prism positioning system 150 moves the non-attenuating, transmission-type diffracting prism 120 in the direction along which the non-attenuating, transmission-type diffracting prism 120 moves into or out of the input portion of the optical path 192 (+/−X direction) and in the direction generally parallel to the input portion of the optical path 192 (+/−Y direction). For example, FIG. 2 is a schematic illustration of the variable optical attenuator 10 shown in FIG. 1 with the non-attenuating, transmission-type diffracting prism 120 depicted as having been moved in the +Y direction compared to the position of the non-attenuating, transmission-type diffracting prism 120 depicted in FIG. 1. It is understood from FIGS. 1 and 2 that the Y direction is a direction along which the non-attenuating, transmission-type diffracting prism 120 moves into or out of the input portion of the optical path 192. By moving the non-attenuating, transmission-type diffracting prism 120 in the +Y direction, a thickness 't' (FIG. 2) between the input face 122 and the output face 124 for the input portion of the optical path 192 within the non-attenuating, transmission-type diffracting prism 120 is greater than the thickness 't' shown in FIG. 1. Changing the thickness between the input face 122 and the output face 124 that the optical signal 190 passes through before being diffracted by the output face 124 changes the output portion of the optical path 192' of the optical signal 190 and varies degree to which the output portion of the optical path 192' from the output face 124 of the non-attenuating, transmission-type diffracting prism aligns (or misaligns) with the output core 114 of the output optical fiber 110. Accordingly, the attenuation of the optical signal 190 from the input optical fiber 100 to the output optical fiber 110 is increased or decreased by movement of the non-attenuating, transmission-type diffracting prism 120 in the Y direction.

Figure 3:
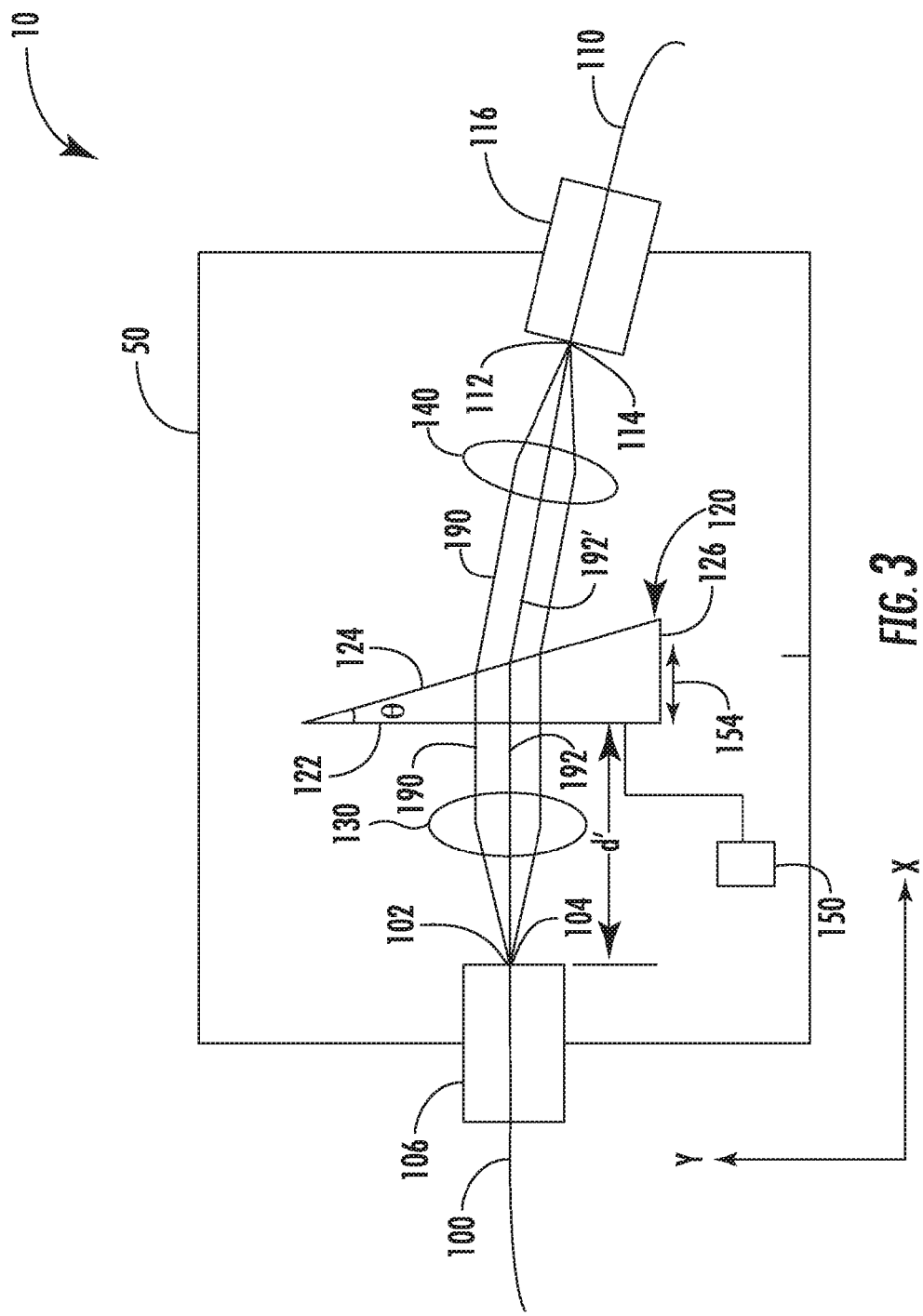
FIG. 3 is a schematic illustration of the variable optical attenuator shown in FIG. 2 with the non-attenuating, transmission-type diffracting prism depicted as having been moved in the +X direction and located in a different position than the non-attenuating, transmission-type diffracting prism in FIG. 2.

Referring now to FIGS. 2 and 3, FIG. 3 is a schematic illustration of the variable optical attenuator 10 shown in FIG. 2 with the non-attenuating, transmission-type diffracting prism 120 depicted as having been moved in the −X direction compared to the non-attenuating, transmission-type diffracting prism 120 depicted in FIG. 2. It is understood from FIGS. 2 and 3 that the X direction is generally parallel to the input portion of the optical path 192. By moving the non-attenuating, transmission-type diffracting prism 120 in the −X direction, a distance 'd' between the input end 102 of the input optical fiber 100 and the input face 122 of the non-attenuating, transmission-type diffracting prism 120 shown in FIG. 2 is reduced to a distance 'd" (FIG. 3). Changing the distance between the input end 102 of the input optical fiber 100 and the input face 122 of the non-attenuating, transmission-type diffracting prism 120 changes the output portion of the optical path 192' of the optical signal 190 and varies degree to which the output portion of the optical path 192' from the output face 124 of the non-attenuating, transmission-type diffracting prism aligns with the output core 114 of the output optical fiber 110. Accordingly, the attenuation of the optical signal 190 from the input optical fiber 100 to the output optical fiber 110 is increased or decreased by movement of the non-attenuating, transmission-type diffracting prism 120 in the X direction.

Figure 4:
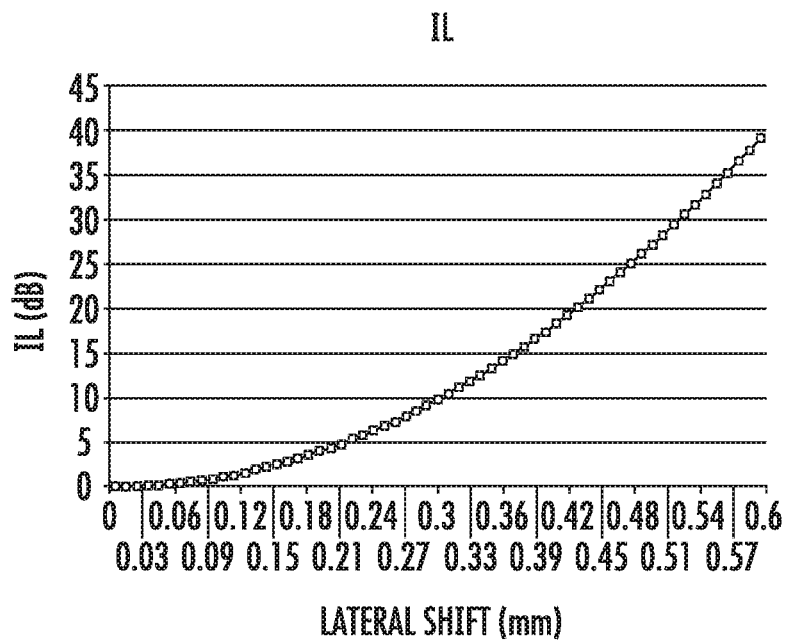
FIG. 4 is a graphical illustration of insertion loss as a function of lateral shift for a variable optical attenuator according to one or more embodiments disclosed and described herein.

Referring now to FIG. 4, a graphical illustration of insertion loss (IL), i.e., attenuation, for the variable optical attenuator 10 as a function of lateral shift for the output portion of the optical path 192' onto the output core 114 of the output optical fiber 110 is shown. For a lateral shift of 0.0 mm, i.e., the optical signal is aligned with the output core 114 of the output optical fiber 110, an insertion loss of 0.0 decibels (dB) is observed. However as the lateral shift increases from 0.0 mm to 0.6 mm, a gradual and continuous smooth increase of the insertion loss from 0.0 dB to about 40.0 dB is observed.

It is understood that the shape of the non-attenuating, transmission-type diffracting prism 120, particularly the non-zero angle θ between the input face 122 and the output face 124, provides a continuous increase or decrease in the thickness t that the optical signal 190 passes through as the non-attenuating, transmission-type diffracting prism 120 moves in the Y direction. Also, the prism positioning system 150 may include a movement mechanism, e.g., a screw drive, that provides continuous smooth movement of the non-attenuating, transmission-type diffracting prism 120 in the Y direction and/or X direction. Also, the movement mechanism such as a screw drive may provide a latching mechanism that holds the non-attenuating, transmission-type diffracting prism 120 at a desired position such that a desired attenuation of the optical signal 190 is maintained even if power to the variable optical attenuator 10 is terminated due to a loss of power, power outage, etc.

Figure 5:
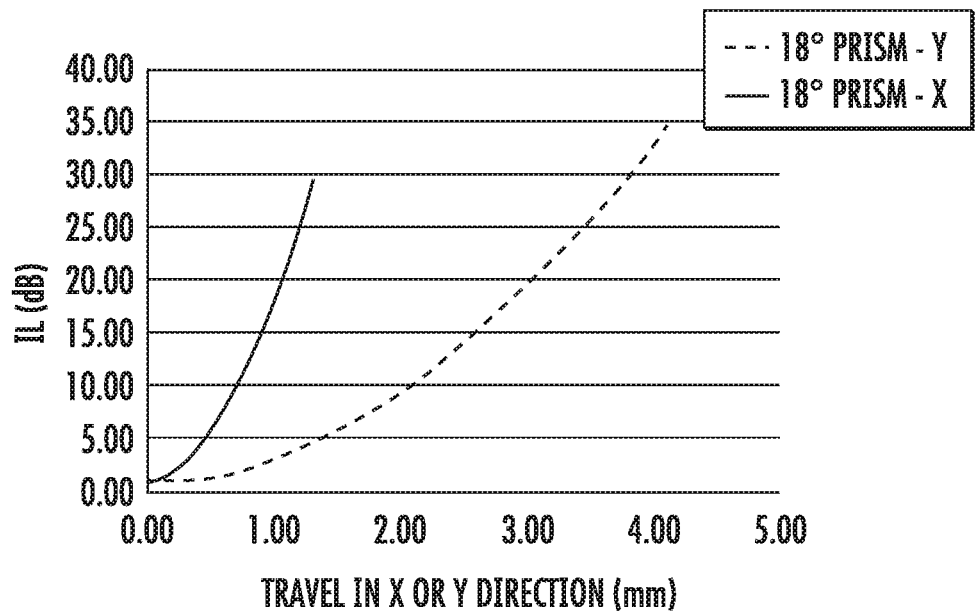
FIG. 5 is a graphical illustration of insertion loss as a function of movement for a non-attenuating, transmission-type diffracting prism according to one or more embodiments disclosed and described herein.

The combination of the non-zero angle θ between the input face 122 and the output face 124 and a continuous smooth movement mechanism provide a high resolution attenuation of the optical signal 190. For example, FIG. 5 is a graphical illustration of insertion loss (IL) as a function of movement of the non-attenuating, transmission-type diffracting prism 120 in the direction generally parallel to the input portion of the optical path 192 (X direction) and in the direction along which the non-attenuating, transmission-type diffracting prism 120 moves into and out of the input portion of the optical path 192 (Y direction). The data shown in FIG. 5 is for a non-attenuating, transmission-type diffracting prism 120 having an angle θ between the input face 122 and the output face 124 equal to 18°. The insertion loss as a function of movement of the non-attenuating, transmission-type diffracting prism 120 in the X direction is represented by the solid line and the insertion loss as a function of movement of the non-attenuating, transmission-type diffracting prism 120 in the Y direction is represented by the dashed line. At an initial or baseline position, the non-attenuating, transmission-type diffracting prism 120 provides about 1.00 dB insertion loss for the optical signal 190. Movement of the non-attenuating, transmission-type diffracting prism 120 in the direction generally parallel to the input portion of the optical path 192 (X direction) by a distance of about 1.20 mm results in a continuous increase in insertion loss of the optical signal 190 up to about 29.00 dB. Movement of the non-attenuating, transmission-type diffracting prism 120 in the Y direction by a distance of about 4.00 mm results in a continuous increase in insertion loss of the optical signal 190 up to about 35.00 dB. Accordingly, the variable optical attenuator 10 smoothly varies the degree to which the output portion of the optical path 192' from the output face 124 of the non-attenuating, transmission-type diffracting prism 120 aligns with the output core 114 of the output optical fiber 110.

Figure 6:
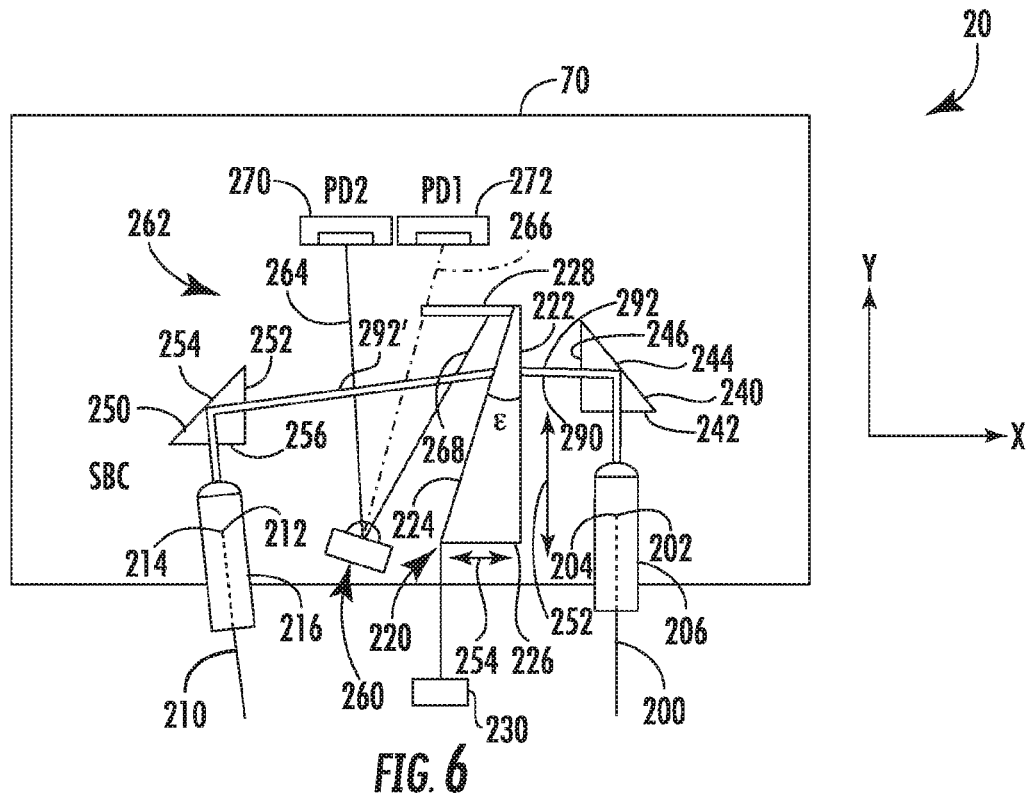
FIG. 6 is a schematic illustration of a variable optical attenuator according to one or more embodiments disclosed and described herein.
Figure 7:
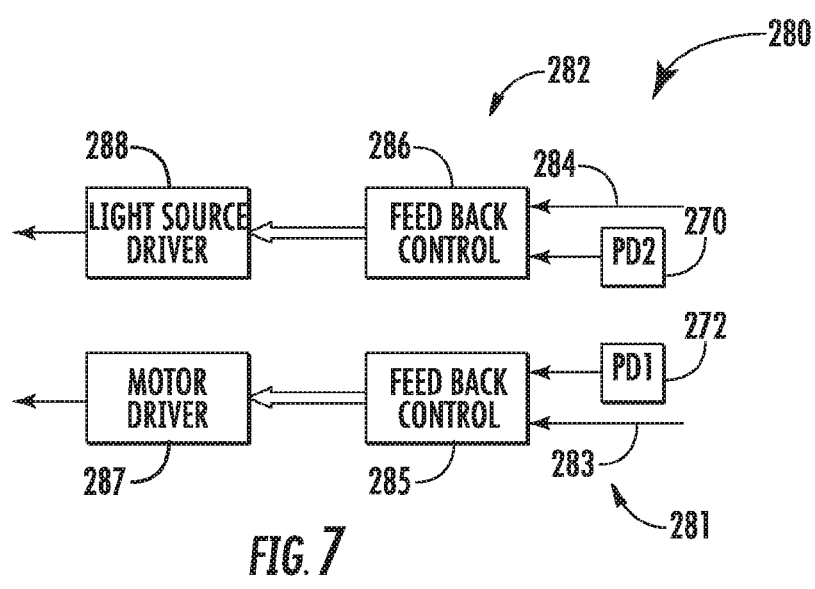
FIG. 7 is a schematic illustration of a prism positioning system with feedback control according to one or more embodiments disclosed and described herein.

Referring now to FIGS. 6 and 7, a variable optical attenuator 20 according to the present disclosure may comprise an input optical fiber 200, an output optical fiber 210, a non-attenuating, transmission-type diffracting prism 220, an input reflector 240, an output reflector 250 and a prism positioning system 230. The input optical fiber 200 has an input end 202 with an input core 204 and the output optical fiber 210 has an output end 212 with an output core 214. In embodiments, the input optical fiber 200, output optical fiber 210, non-attenuating, transmission-type diffracting prism 220, input reflector 240 and output reflector 250 are at least partially enclosed within and attached to an enclosure 70, i.e., the enclosure 70 may provide a structure support or base for the various components of the variable optical attenuator 20. The input optical fiber 200 may be attached to and aligned with an input collimator 206 and the output optical fiber 210 may be attached to and aligned with an output collimator 216. The input collimator 206 may be aligned non-parallel to the output collimator 216. The non-attenuating, transmission-type diffracting prism 220 has an input face 222 and an output face 224 oriented an angle ε relative to the input face 222. A base face 226 may extend between the input face 222 and the output face 224.

The input reflector 240 has an input face 242, a reflecting face 244 and an output face 246. In embodiments, the input face 242 and the output face 246 are transmittance faces, i.e., the input face 242 and output face 246 allow an optical signal to pass through and not be reflected, whereas the reflecting face 244 reflects an optical signal. The output reflector 250 has an input face 252, a reflecting face 254 and an output face 256. In embodiments, the input face 252 and the output face 256 are transmittance faces and the reflecting face 254 is a reflecting face.

An optical signal 290 propagating from the input core 204 of the input optical fiber 200 is transmitted through the input face 242 of the input reflector 240, reflected from the reflecting face 244 and transmitted through the output face 246. The optical signal 290 transmitted through the output face 246 of the input reflector 240 propagates to and passes through the input face 222 of the non-attenuating, transmission-type diffracting prism 220, and propagates through the non-attenuating, transmission-type diffracting prism 220 to the output face 224. In embodiments, an anti-reflection coating (not shown) extends over the input face 222 and the output face 224 in order to minimize or eliminate reflection of the optical signal 290 by the input face 222 and the output face 224. The optical signal 290 is transmitted through and diffracted by the output face 224 onto the input face 252 of the output reflector 250. The optical signal 290 is transmitted through the input face 252, reflected from the reflecting face 254 and transmitted through the output face 256 onto the output core 214 of the output optical fiber 210. The optical signal is diffracted by the output face 224 of the non-attenuating, transmission-type diffracting prism 220 such that an input portion of the optical path 292 from the output face 246 of the input reflector 240 is non-linear to an output portion of the optical path 292' from the output face 224 of the non-attenuating, transmission-type diffracting prism 220 to the input face 252 of the output reflector 250. In embodiments, an input lens (not shown) is positioned between the input core 204 of the input optical fiber 200 and the input face 222 of the non-attenuating, transmission-type diffracting prism 120 and an output lens (not shown) is positioned between the output face 224 and the output core 214 of the output optical fiber 210 as described above with reference to FIGS. 1-3 above.

The prism positioning system 230 (FIG. 7) is coupled and configured to change the pose of the non-attenuating, transmission-type diffracting prism 220 within the input portion of the optical path 292. Changing the pose of the non-attenuating, transmission-type diffracting prism 220 within the input portion of the optical path 292 changes or varies the degree to which the output portion of the optical path 292' is aligned with the output core 214 of the output optical fiber 210. In embodiments, the prism positioning system 230 moves the non-attenuating, transmission-type diffracting prism 220 in a direction along which the non-attenuating, transmission-type diffracting prism 220 moves into or out of the input portion of the optical path 292 as indicated by the double headed arrow 252 (+/−Y direction). In such embodiments, a thickness between the input face 222 and the output face 224 through which the optical signal 290 passes through changes, i.e., increases or decreases. In other embodiments, the prism positioning system 230 moves the non-attenuating, transmission-type diffracting prism 220 in a direction generally parallel to the input portion of the optical path 292 as indicated by the double headed arrow 254 (+/−X direction). In such embodiments, a distance between the input face 222 and the output face 246 of the input reflector 240 changes, i.e., increases or decreases. In still other embodiments, the prism positioning system 230 moves the non-attenuating, transmission-type diffracting prism 220 in the direction generally parallel to the input portion of the optical path 192 (+/−X direction) and in the direction along which the non-attenuating, transmission-type diffracting prism 220 moves into or out of the input portion of the optical path 192 (+/−Y direction).

It is understood that the shape of the non-attenuating, transmission-type diffracting prism 220, particularly the non-zero angle $\epsilon$ between the input face 222 and the output face 224, provides a continuous increase or decrease in the thickness t that the optical signal 290 passes through as the non-attenuating, transmission-type diffracting prism 220 moves in the Y direction. Also, the prism positioning system 230 may include a movement mechanism, e.g., a screw drive, that provides continuous smooth movement of the non-attenuating, transmission-type diffracting prism 220 in the Y direction and/or X direction. The movement mechanism such as a screw drive may provide a latching mechanism that holds the non-attenuating, transmission-type diffracting prism 220 at a desired position such that a desired attenuation of the optical signal 290 is maintained even if power to the variable optical attenuator 10 is terminated due to a loss of power, power outage, etc. The combination of the non-zero angle $\epsilon$ between the input face 222 and the output face 224 and a continuous smooth movement mechanism provide a high resolution attenuation of the optical signal 290.

In embodiments, the variable optical attenuator 20 includes an intensity-independent positioning feedback system 280 (FIG. 7) with two control loops that provide accurate positioning of the non-attenuating, transmission-type diffracting prism 220 relative to the input portion of the optical path 292. Referring to FIGS. 6 and 7, the intensity-independent positioning feedback system 280 may include a blocking element 228, a feedback light source 260 (e.g., a light emitting diode), a light source integrity photodetection zone 270, a prism movement photodetection zone 272, a prism positioning motor driver feedback control loop 281 and a light source feedback control loop 282. The feedback light source 260 defines an optically diverging interrogation path 262 and the light source integrity photodetection zone 270 and prism movement photodetection zone 272 are positioned in different portions of the optically diverging interrogation path 262. In embodiments, the light source integrity photodetection zone 270 and the prism movement photodetection zone 272 are positioned in a common detection plane of the optically diverging interrogation path 262. The feedback light source 260 may be a light emitting diode (LED) and the light source integrity photodetection zone 270 and prism movement photodetection zone 272 correspond to a pair of photodetectors, for example, a light source integrity photodetector 270 and a prism movement photodetector 272, respectively.

The degree of optical obstruction in the prism movement photodetection zone 272 varies with movement of the non-attenuating, transmission-type diffracting prism 220 such that an intensity feedback signal from the prism movement photodetection zone 272 is indicative of the movement of the non-attenuating, transmission-type diffracting prism 220. Also, the degree of optical obstruction in the light source integrity photodetection zone 270 is independent of movement of the non-attenuating, transmission-type diffracting prism 220 such that an intensity feedback signal from the light source integrity photodetection zone 270 is indicative of an absolute intensity of the feedback light source 260. The optical obstruction in the prism movement photodetection zone 272 may be attributable to movement of the blocking element 228 with the non-attenuating, transmission-type diffracting prism 220. For example, the blocking element 228 may be attached to and extend from the non-attenuating, transmission-type diffracting prism 220 such that the blocking element 228 is positioned in the optically diverging interrogation path 262 within the prism movement photodetection zone 272. Movement of the non-attenuating, transmission-type diffracting prism 220 moves the blocking element 228 within the prism movement photodetection zone 272 such that the degree of optical obstruction of the in the optically diverging interrogation path 262 within the prism movement photodetection zone 272 is a function of the position of the non-attenuating, transmission-type diffracting prism 220. Particularly, an unblocked portion 264 of the optically diverging interrogation path 262 from the feedback light source 260 provides an absolute intensity of the feedback light source 260. However, the blocking element 228 blocks a portion of the optically diverging interrogation path 262 (blocked portion 268 shown in FIG. 7) within the prism movement photodetection zone 272. Accordingly, an incident portion 266 of the optically diverging interrogation path 262 detected within the prism movement photodetection zone 272 is indicative of the position of the non-attenuating, transmission-type diffracting prism 220. That is, as the non-attenuating, transmission-type diffracting prism 220 moves in the X direction and/or the Y direction, the amount the optically diverging interrogation path 262 within the prism movement photodetection zone 272 that is blocked by the blocking element 228 (i.e., the blocked portion 268), and the intensity of the incident portion 266 within the prism movement photodetection zone 272, varies. A signal proportional to the intensity of the incident portion 266 of the optically diverging interrogation path 262, e.g., a photodetector intensity signal, may be provided to a feedback control module 285 in the prism positioning motor driver feedback control loop 281. A position signal 283 from a motor driver 287 that moves the non-attenuating, transmission-type diffracting prism 220 may also be provided to the feedback control module 285. The feedback control module 285 receives the signal proportional to the intensity of the incident portion 266 and the position signal 283 from the motor driver 287 and updates instructions to the motor driver 287 as to whether or not to move the non-attenuating, transmission-type diffracting prism 220 in order to obtain a desired attenuation of the optical signal 290.

To ensure the feedback light source 260 provides an optically diverging interrogation path 262 with a constant intensity and intensity variation of the incident portion 266 of the optically diverging interrogation path 262 within the prism movement photodetection zone 272 is due to movement of the blocking element 228, and not due to intensity variation of the optically diverging interrogation path 262 intensity, the light source feedback control loop 282 is employed. Particularly, an unblocked portion 264 of the optically diverging interrogation path 262 within the light source integrity photodetection zone 270 is indicative of an absolute intensity of the feedback light source 260. The absolute intensity of the an unblocked portion 264 of the optically diverging interrogation path 262 within the light source integrity photodetection zone 270 may be used as a reference intensity signal and be provided to the feedback control module 286 in the light source feedback control loop 282. A feedback light source power signal 284 indicative of power being provided to the feedback light source 260 by a feedback light source driver 288 may also be provided to the feedback control module 286. The feedback control module 285 receives the reference intensity signal and the feedback light source power signal 284 and updates instructions to the feedback light source driver 288 to increase or decrease power to the feedback light source 260 in order to maintain an optically diverging interrogation path 262 with a constant intensity.

Figure 8:
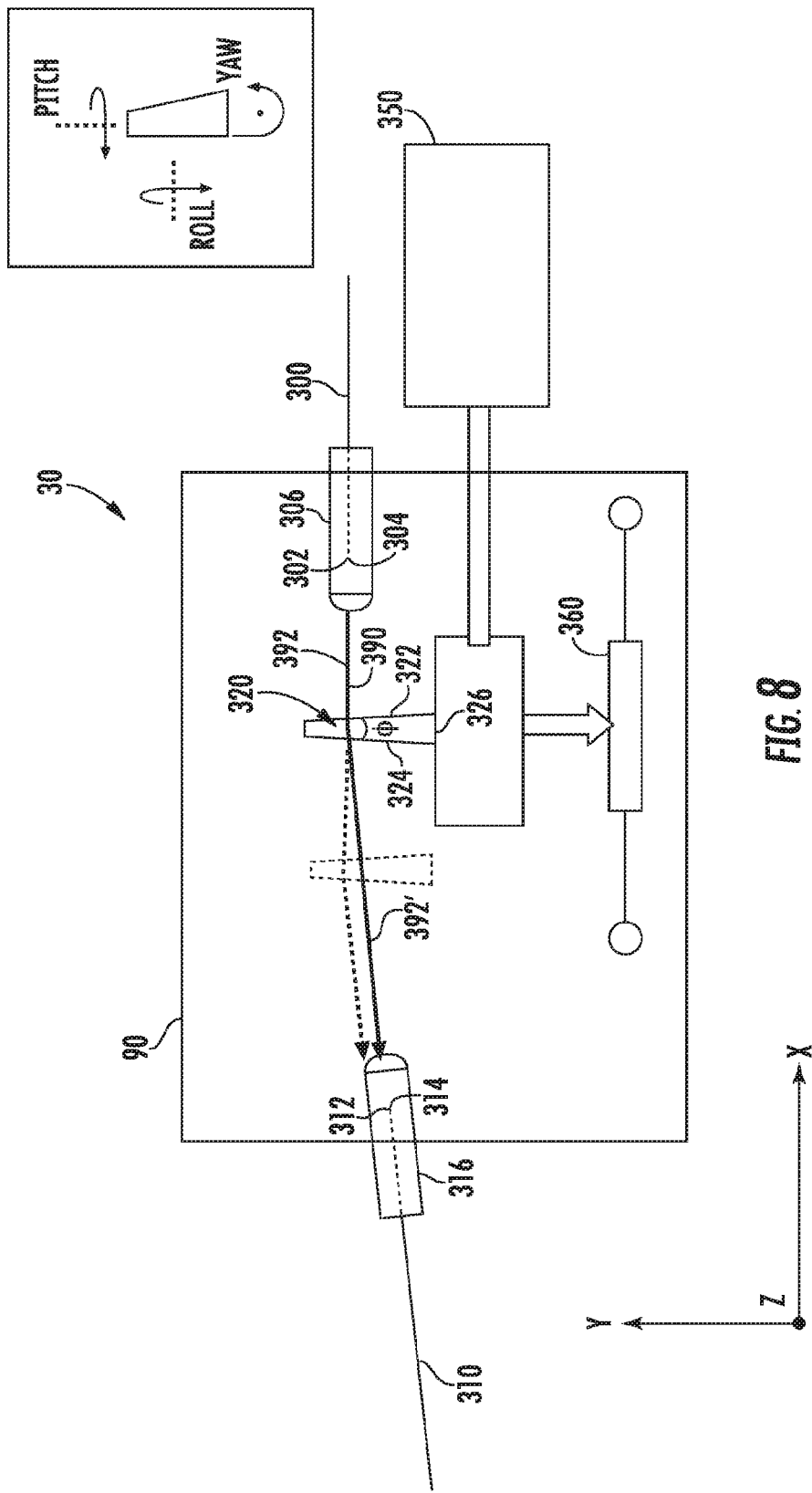
FIG. 8 is a schematic illustration of a variable optical attenuator according to one or more embodiments disclosed and described herein.

Referring to FIG. 8, a variable optical attenuator 30 according to the present disclosure may comprise an input optical fiber 300, an output optical fiber 310, a non-attenuating, transmission-type diffracting prism 320, a prism positioning system 350 and a position sensor 360. In embodiments, the input optical fiber 300, output optical fiber 310, non-attenuating, transmission-type diffracting prism 320 and position sensor 360 are at least partially enclosed within and attached to an enclosure 90, i.e., the enclosure 90 may provide a structure support or base for the various components of the variable optical attenuator 30. The input optical fiber 300 has an input end 302 with an input core 304 and the output optical fiber 310 has an output end 312 with an output core 314. The input optical fiber 300 may be attached to and aligned with an input collimator 306 and the output optical fiber 310 may be attached to and aligned with an output collimator 316. In embodiments, the input collimator 306 and the output collimator 316 are aligned non-parallel to each other. The non-attenuating, transmission-type diffracting prism 320 has an input face 322 and an output face 324 oriented at a non-zero angle φ relative to the input face 322. The non-attenuating, transmission-type diffracting prism 320 is a low-angle non-attenuating, transmission-type diffracting prism with the angle φ being less than 5°. In embodiments, the angle φ is less than 2.5°. In other embodiments, the angle φ is less than 2.0°. A base face 326 may extend between the input face 322 and the output face 324. An optical signal 390 from the input core 304 of the input optical fiber 300 is transmitted through the non-attenuating, transmission-type diffracting prism 320 by passing through the input face 322 and the output face 324. In embodiments, an anti-reflection coating (not shown) extends over the input face 322 and the output face 324 in order to minimize or eliminate reflection of the optical signal 390 by the input face 322 and the output face 324. The non-attenuating, transmission-type diffracting prism 320 diffracts the optical signal 390 from the input core 304 of the input optical fiber 300 onto the output core 314 of the output optical fiber 310 such that an input portion of the optical path 392 from the input core 304 of the input optical fiber 300 to the input face 322 is non-linear with an output portion of the optical path 392' from the output face 324 to the output core 314 of the output optical fiber 310.

The prism positioning system 350 is configured to change the pose of the non-attenuating, transmission-type diffracting prism 320 within the input portion of the optical path 392. For example, prism positioning system 350 is configured to linearly move the non-attenuating, transmission-type diffracting prism 320 in the +/−X direction, +/−Y direction and/or +/−Z direction depicted in FIG. 8. The prism positioning system 350 is also configured to rotate the non-attenuating, transmission-type diffracting prism 320 within the input portion of the optical path 392 about the X-axis, Y-axis and/or Z-axis depicted in FIG. 8. For purposes of defining the variable optical attenuator of the present disclosure, it is noted that rotation of the non-attenuating, transmission-type diffracting prism 320 about the axis X-axis depicted in FIG. 8 is referred to as "roll" of the non-attenuating, transmission-type diffracting prism 320; rotation of the non-attenuating, transmission-type diffracting prism 320 about the axis Y-axis depicted in FIG. 8 is referred to as "pitch" of the non-attenuating, transmission-type diffracting prism 320; and rotation of the non-attenuating, transmission-type diffracting prism 320 about the axis Z-axis depicted in FIG. 8 is referred to as "yaw" of the non-attenuating, transmission-type diffracting prism 320. Changing the pose of the non-attenuating, transmission-type diffracting prism 320 within the input portion of the optical path 392 changes or varies the degree to which the output portion of the optical path 392' is aligned with the output core 314 of the output optical fiber 310 thereby providing a variation in attenuation of the optical signal 390 as a function of position of the non-attenuating, transmission-type diffracting prism 320.

Figure 9:
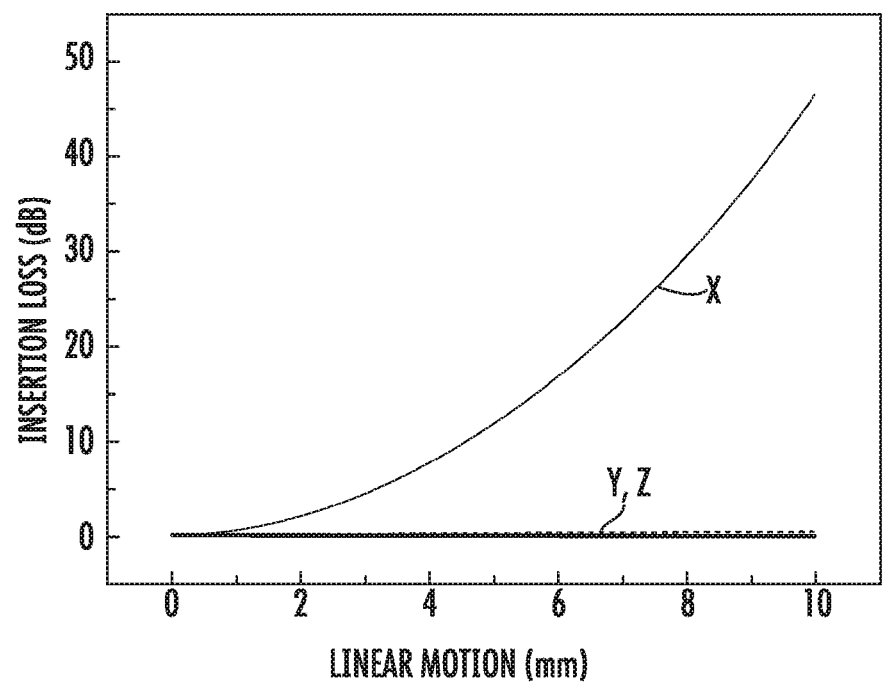
FIG. 9 is a graphical illustration of insertion loss as a function of linear movement along the X-, Y- and Z-axes of a Cartesian coordinate system for the non-attenuating, transmission-type diffracting prism depicted in FIG. 8.

Referring to FIG. 9, a graphical illustration of insertion loss as a function of linear movement of the non-attenuating, transmission-type diffracting prism 320 in the X, Y and Z direction depicted in FIG. 8 is shown. The data shown in FIG. 9 is for the non-attenuating, transmission-type diffracting prism 320 having an angle φ equal to 1.6° between the input face 322 and the output face 324. Linear movement of the non-attenuating, transmission-type diffracting prism 320 along the X-axis depicted in FIG. 8 from a 0.0 mm position to a 10.0 mm position results in a continuous increase in insertion loss from 0.0 dB to about 47.0 dB. In contrast, a negligible increase in insertion loss is provided for a similar amount of linear movement of the non-attenuating, transmission-type diffracting prism 320 along the Y-axis and Z-axis depicted in FIG. 8.

Figure 10:
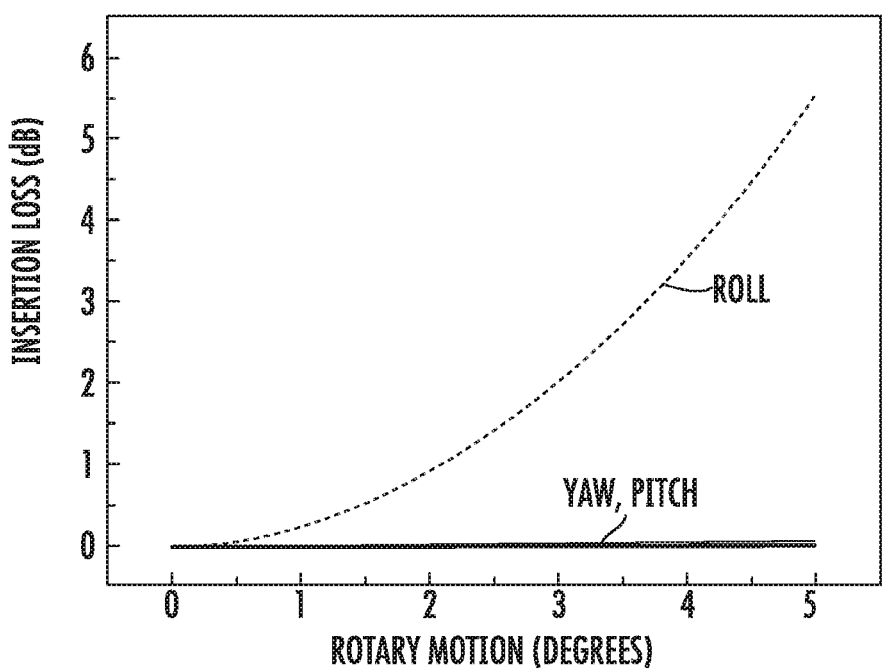
FIG. 10 is a graphical illustration of insertion loss as a function of rotational movement about the X-, Y- and Z-axes of a Cartesian coordinate system for the non-attenuating, transmission-type diffracting prism depicted in FIG. 8.

Referring to FIG. 10, a graphical illustration of insertion loss as a function of rotation of the non-attenuating, transmission-type diffracting prism 320 about the X-, Y- and Z-axes depicted in FIG. 8 is shown. The data shown in FIG. 10 is for the non-attenuating, transmission-type diffracting prism 320 having the angle φ equal to 1.6° between the input face 322 and the output face 324. Rotation of the non-attenuating, transmission-type diffracting prism 320 about the X-axis (roll) depicted in FIG. 8 from a 0° position to a 5° position resulted in a continuous increase in insertion loss from 0.0 dB to about 5.7 dB. In contrast, a negligible increase in insertion loss is provided for a similar rotation of the non-attenuating, transmission-type diffracting prism 320 about the Y-axis (pitch) and Z-axis (yaw) depicted in FIG. 8.

Referring to FIG. 11, the prism positioning system 350 may include one or more manual prism positioning systems with a threaded shaft 352 and a threaded block 354 that provide a continuous smooth movement mechanism as opposed to a discontinuous step-like movement mechanism. The threaded shaft 352 has an external thread 353 and the threaded block 354 has an aperture 355 with an internal thread (not shown) complementary with the external threaded 353. The threaded shaft 352 is positioned within the aperture 355 of the threaded block 354 with the external thread 353 engaged with the internal thread (not shown) of the aperture 355. The non-attenuating, transmission-type diffracting prism 320 is attached to the threaded block 354. The input collimator 306 with the input optical fiber 300 attached and aligned therewith and the output collimator 316 with the output optical fiber 310 attached and aligned therewith are positioned relative to the non-attenuating, transmission-type diffracting prism 320 such that the optical signal 390 depicted propagating from the input core 304 of the input optical fiber 300 passes through the non-attenuating, transmission-type diffracting prism 320 and is diffracted to the output core 314 of the output optical fiber 310.

Rotation of the threaded shaft 352 relative to the threaded block 354 moves the threaded block 354 and the non-attenuating, transmission-type diffracting prism 320 in a continuous smooth motion along the threaded shaft 352. It is understood that the continuous smooth motion of the non-attenuating, transmission-type diffracting prism 320 provides high resolution attenuation of the optical signal 390 as discussed above in relation to FIGS. 1-3 and 5. The threaded shaft 352 and threaded block 354 also provide a high resolution latching mechanism that "latches" or maintains the non-attenuating, transmission-type diffracting prism 320 at desired a position such that a desired attenuation of the optical signal 390 is maintained even if power to the variable optical attenuator 30 is terminated due to a loss of power, power outage, etc.

In embodiments, the position of the threaded shaft 352 is fixed in relation to the input collimator 306 and output collimator 316 such that rotation of the threaded shaft within the threaded block 354 moves the threaded block along the X-axis depicted in FIG. 11. In embodiments, one or more guide pins 356 may be included to aid in movement of the threaded block 354 along the X-axis. Movement of the non-attenuating, transmission-type diffracting prism 320 along the X-axis moves positions the non-attenuating, transmission-type diffracting prism 320 closer to or further away from the input core 304 of the input optical fiber 300 and thereby changes or varies the degree to which the output portion of the optical path 392' is aligned with the output core 314 of the output optical fiber 310. It is understood the prism positioning system 350 may be arranged or have an orientation such that continuous smooth motion of the non-attenuating, transmission-type diffracting prism 320 in Y direction, the Z direction, the X and Y direction, the X and Z direction or the X, Y, and Z direction is provided. That is, a screw drive such as the threaded shaft 352 may be aligned with X, Y, or Z direction depicted in FIG. 11 in order to provide continuous smooth motion of the threaded block 354 in the X, Y, or Z direction, respectively. Also, another threaded shaft 352 in combination with another aperture 355 (not shown in FIG. 11) oriented in the Y direction and/or yet another threaded shaft aperture 352 in combination with yet another aperture 355 oriented in the Z direction may be included and provide continuous smooth motion of the threaded block 354 in the Y and/or Z directions. It is also understood that while FIG. 11 depicts a manual prism positioning system, the threaded shaft 352 may be rotated using an electric motor, hydraulic motor, pneumatic motor and the like.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A variable optical attenuator comprising:
an input optical fiber comprising an input core;
an output optical fiber comprising an output core;
a non-attenuating, transmission-type diffracting prism; and
a prism positioning system; wherein
the input optical fiber, the non-attenuating, transmission-type diffracting prism and the output optical fiber are optically arranged such that an optical path from the input core of the input optical fiber to the output core of the output optical fiber passes through the non-attenuating, transmission-type diffracting prism;
the non-attenuating, transmission-type diffracting prism comprises an input face and an output face oriented at a non-zero angle relative to the input face;
the non-attenuating, transmission-type diffracting prism is configured to diffract an optical signal propagating from the input optical fiber to the output optical fiber such that an input portion of the optical path from the input core to the input face of the non-attenuating, transmission-type diffracting prism is non-linear with an output portion of the optical path from the output face of the non-attenuating, transmission-type diffracting prism to the output core; and
a pose of the non-attenuating, transmission-type diffracting prism is changeable within the optical path by the prism positioning system to vary the degree to which the output portion of the optical path is aligned with the output core of the output optical fiber.

2. The variable optical attenuator of claim 1, wherein the prism positioning system is for moving the non-attenuating, transmission-type diffracting prism in a direction along which the non-attenuating, transmission-type diffracting prism moves into or out of the input portion of the optical path from the input core to the input face of the non-attenuating, transmission-type diffracting prism such that a thickness through which the optical signal passes between the input face and the output face of the non-attenuating, transmission-type diffracting prism changes.

3. The variable optical attenuator of claim 1, wherein the prism positioning system is for moving the non-attenuating, transmission-type diffracting prism in a direction generally parallel to the input portion of the optical path from the input core to the input face of the non-attenuating, transmission-type diffracting prism such that a distance between the input face of the non-attenuating, transmission-type diffracting prism and the input core of the input optical fiber changes.

4. The variable optical attenuator of claim 3, wherein the prism positioning system comprises a threaded shaft and a threaded block, wherein the non-attenuating, transmission-type diffracting prism is attached to the threaded block such that rotating of the threaded shaft moves the threaded block and the non-attenuating, transmission-type diffracting prism in the direction generally parallel to the input portion of the optical path from the input core to the input face of the non-attenuating, transmission-type diffracting prism.

5. The variable optical attenuator of claim 1, wherein the prism positioning system is for moving the non-attenuating, transmission-type diffracting prism in a direction along which the non-attenuating, transmission-type diffracting prism moves into or out of the input portion of the optical path from the input core to the input face of the non-attenuating, transmission-type diffracting prism and in another direction generally parallel to the optical path from the input core to the input face of the non-attenuating, transmission-type diffracting prism.

6. The variable optical attenuator of claim 1, wherein the prism positioning system is for rotating the non-attenuating, transmission-type diffracting prism about an axis to produce a roll of the non-attenuating, transmission-type diffracting prism.

7. The variable optical attenuator of claim 1, wherein the prism positioning system is for rotating the non-attenuating, transmission-type diffracting prism about an axis to produce a pitch of the non-attenuating, transmission-type diffracting prism.

8. The variable optical attenuator of claim 1, wherein the prism positioning system is for rotating the non-attenuating, transmission-type diffracting prism about an axis to produce a yaw of the non-attenuating, transmission-type diffracting prism.

9. The variable optical attenuator of claim 1, further comprising an input reflector and an output reflector, wherein:
the input reflector is positioned between the input core of the input optical fiber and the input face of the non-attenuating, transmission-type diffracting prism for reflecting the optical signal propagating from the input core to the input face of the non-attenuating, transmission-type diffracting prism; and
the output reflector is positioned between the output face of the non-attenuating, transmission-type diffracting prism and the output core of the output optical fiber for reflecting the optical signal propagating from the output face of the non-attenuating, transmission-type diffracting prism to the output core of the output optical fiber.

10. The variable optical attenuator of claim 9, further comprising an input fiber handling ferrule and an output fiber handling ferrule, wherein:
the input optical fiber is aligned within the input fiber handling ferrule;
the output optical fiber is aligned with the output optical fiber; and
the input fiber handling ferrule is oriented non-parallel to the output fiber handling ferrule.

11. The variable optical attenuator of claim 1, wherein:
the variable optical attenuator further comprises an intensity-independent positioning feedback system comprising a feedback light source, a light source integrity photodetection zone, and a prism movement photodetection zone;
the feedback light source defines an optically diverging interrogation path;
the light source integrity photodetection zone and the prism movement photodetection zone are positioned in different portions of the optically diverging interrogation path;
the degree of optical obstruction in the prism movement photodetection zone varies with movement of the non-attenuating, transmission-type diffracting prism such that an intensity feedback signal from the prism movement photodetection zone is indicative of prism movement; and the degree of optical obstruction in the light source integrity photodetection zone is independent of movement of the non-attenuating, transmission-type diffracting prism such that an intensity feedback signal from the light source integrity photodetection zone is indicative of an absolute intensity of the feedback light source.

12. The variable optical attenuator of claim 11, wherein:
the variable optical attenuator further comprises a blocking element; and
optical obstruction in the prism movement photodetection zone is attributable to movement of the blocking element with the non-attenuating, transmission-type diffracting prism.

13. The variable optical attenuator of claim 12, wherein the blocking element is attached to and extends from the non-attenuating, transmission-type diffracting prism.

14. The variable optical attenuator of claim 11, wherein the light source integrity photodetection zone and a prism movement photodetection zone correspond to a pair of photodetectors.

15. The variable optical attenuator of claim 11, wherein the light source integrity photodetection zone and the prism movement photodetection zone are positioned in a common detection plane of the optically diverging interrogation path.

16. A variable optical attenuator comprising:
an input optical fiber comprising an input core;
an output optical fiber comprising an output core;
a non-attenuating, transmission-type diffracting prism;
a prism positioning system; and
an intensity-independent positioning feedback system; wherein
the input optical fiber, the non-attenuating, transmission-type diffracting prism and the output optical fiber are optically arranged such that an optical path from the input core of the input optical fiber to the output core of the output optical fiber passes through the non-attenuating, transmission-type diffracting prism;
the non-attenuating, transmission-type diffracting prism comprises an input face and an output face oriented at a non-zero angle relative to the input face;
the non-attenuating, transmission-type diffracting prism is configured to diffract an optical signal propagating from the input optical fiber to the output optical fiber such that an input portion of the optical path from the input core to the input face of the non-attenuating, transmission-type diffracting prism is non-linear with an output portion of the optical path from the output face of the non-attenuating, transmission-type diffracting prism to the output core;
a pose of the non-attenuating, transmission-type diffracting prism is changeable within the optical path by the prism positioning system to vary the degree to which the output portion of the optical path is aligned with the output core of the output optical fiber;
the intensity-independent positioning feedback system comprises a feedback light source, a light source integrity photodetection zone, and a prism movement photodetection zone;
the feedback light source defines an optically diverging interrogation path;
the light source integrity photodetection zone and the prism movement photodetection zone are positioned in different portions of the optically diverging interrogation path;
the degree of optical obstruction in the prism movement photodetection zone varies with movement of the non-attenuating, transmission-type diffracting prism such that an intensity feedback signal from the prism movement photodetection zone is indicative of prism movement; and the degree of optical obstruction in the light source integrity photodetection zone is independent of movement of the non-attenuating, transmission-type diffracting prism such that an intensity feedback signal from the light source integrity photodetection zone is indicative of an absolute intensity of the feedback light source.

17. The variable optical attenuator of claim 16, wherein:
the variable optical attenuator further comprises a blocking element; and optical obstruction in the prism movement photodetection zone is attributable to movement of the blocking element with the non-attenuating, transmission-type diffracting prism.

18. The variable optical attenuator of claim 16, wherein the light source integrity photodetection zone and a prism movement photodetection zone correspond to a pair of photodetectors.

19. The variable optical attenuator of claim 16, where the prism positioning system comprises a latching mechanism holding the non-attenuating, transmission-type diffracting prism at a desired position such that a desired attenuation of the optical signal is maintained when power to the variable optical attenuator is terminated.

20. A method for variably attenuating an optical signal comprising:
positioning a non-attenuating, transmission-type diffracting prism within an optical path between an input optical fiber comprising an input core and an output optical fiber comprising an output core such that the optical path from the input core of the input optical fiber to the output core of the output optical fiber passes through the non-attenuating, transmission-type diffracting prism, wherein the non-attenuating, transmission-type diffracting prism comprises an input face and an output face oriented at a non-zero angle relative to the input face;

diffracting an optical signal propagating from the input optical fiber to the output optical fiber such that an input portion of the optical path from the input core to the input face of the non-attenuating, transmission-type diffracting prism is non-linear with an output portion of the optical path from the output face of the non-attenuating, transmission-type diffracting prism to the output core; and changing a pose of the non-attenuating, transmission-type diffracting prism within the optical path with a prism positioning system to vary the degree to which the output portion of the optical path is aligned with the output core of the output optical fiber.

21. The method of claim 20, wherein the prism positioning system comprises a threaded shaft and a threaded block, wherein the non-attenuating, transmission-type diffracting prism is attached to the threaded block such that rotating of the threaded shaft moves the threaded block and changes the prose of the non-attenuating, transmission-type diffracting prism within the optical path.

* * * * *